Patented Feb. 18, 1936

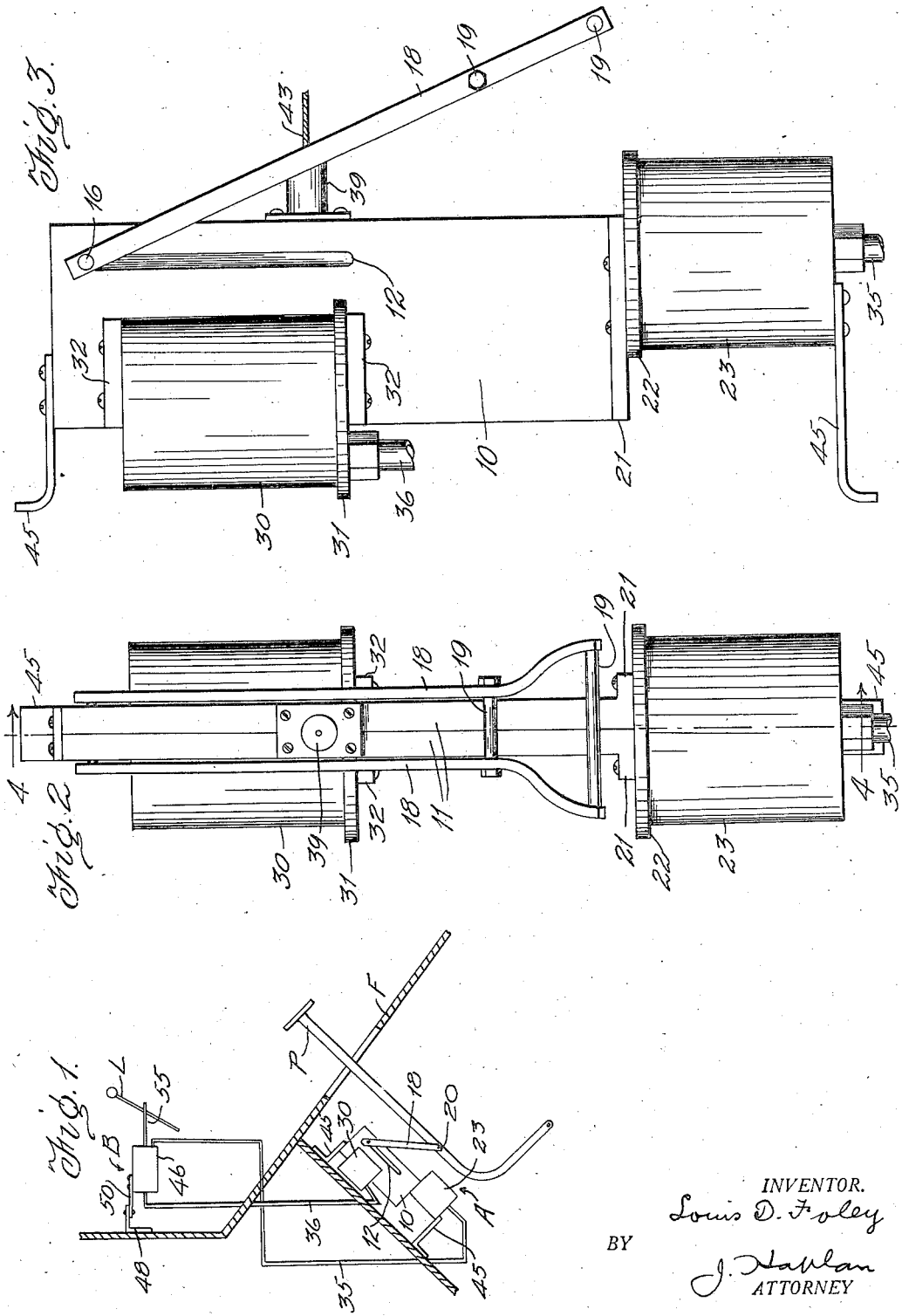

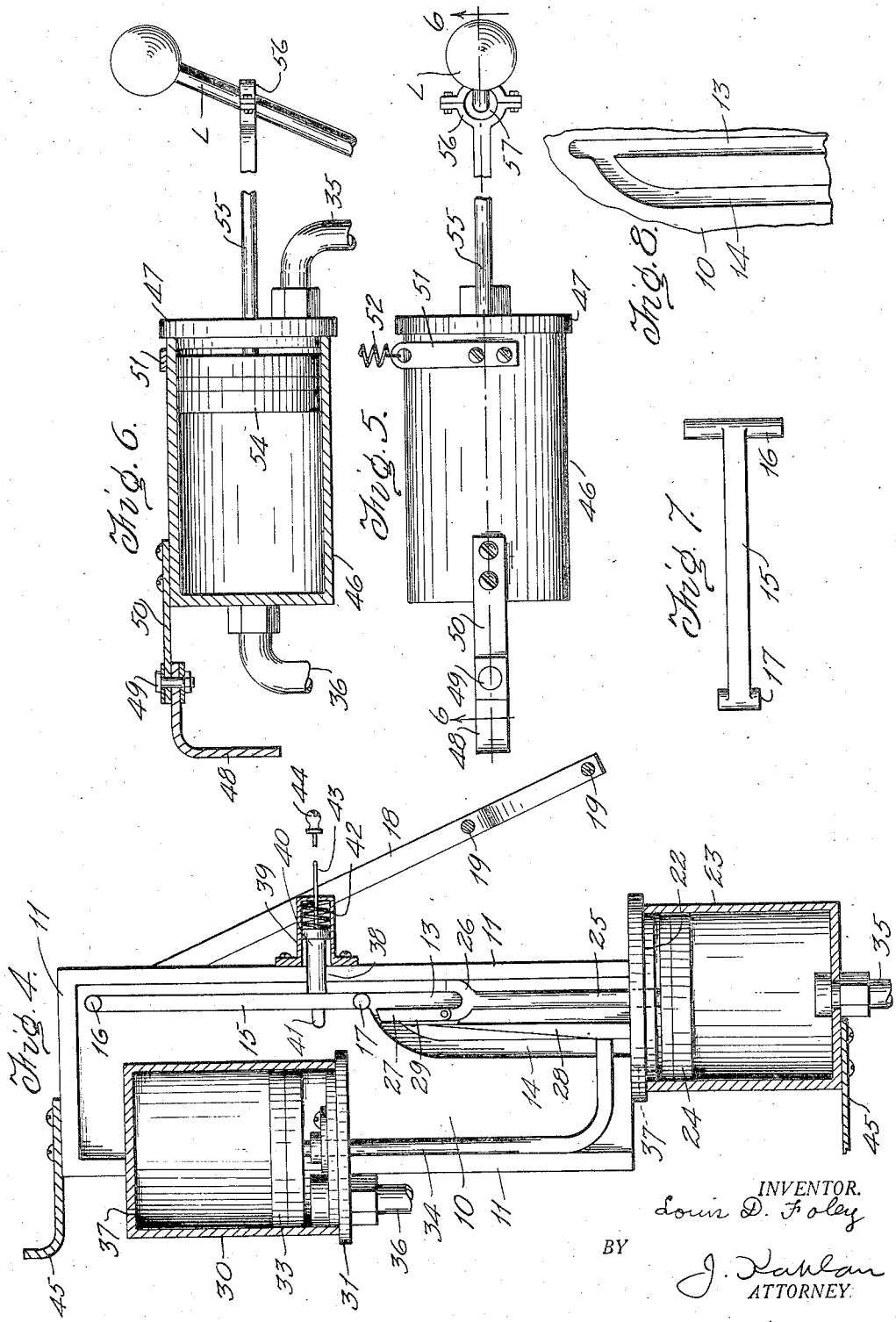

2,031,364

UNITED STATES PATENT OFFICE 2,031,364

HYDRAULIC GEAR SHIFT

Louis D. Foley, Louisville, Ky.

Application June 17, 1935, Serial No. 27,069

16 Claims. (Cl. 74—334)

This invention relates to automobile gear shifters and has special reference to a hydraulic gear shifter which may be attached to any of the automobiles now in general use.

One important object of the invention is to provide a novel device of this character wherein hydraulic pressure produced by depressing the clutch lever or pedal of an automobile acts to move the gear shift lever of said automobile.

A second important object of the invention is to provide hydraulic means for operating the gear shift lever, the means being so arranged that successive depressions of the clutch pedal cause movement of the gear shift lever from "low" through "second" to "high" gear position.

A third important object of the invention is to provide a device of this character which may be used in connection with the type of gear shift wherein the upper end of the gear lever is in rearward position in high gear (the present standard gear shift) or in connection with the gear shift used by certain automobiles in which the high gear position of the gear shift lever is forward.

A fourth important object of the invention is to provide a novel device of this character wherein the pressure producing mechanism is prepared, by one depression of the clutch pedal, with its parts in position for operative action by the next depression of the clutch pedal.

A fifth important object of the invention is to provide a novel device of this character whereby the gear shift lever may be shifted by successive depressions of the clutch pedal, from neutral to "second" and then to "high" and in which this action may be reversed.

With the above and other objects in view, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a somewhat diagrammatic view showing the relation of the invention to the clutch pedal and gear shift lever of an automobile.

Figure 2 is a front elevation of the pressure producing means used herein.

Figure 3 is a side elevation thereof.

Figure 4 is a section on the line 4—4 of Figure 2.

Figure 5 is a plan view of the cylinder for operating the gear shift lever.

Figure 6 is a section on the line 6—6 of Figure 5.

Figure 7 is a detail elevation of a certain push bar used in connection with the apparatus of Figure 4.

Figure 8 is a detail section on the same line as Figure 4 but showing only a portion of the apparatus to disclose certain grooves therein.

In the embodiment of the invention as here shown there is illustrated a pressure providing unit indicated in general at A and pressure actuated means indicated in general at B. These parts are shown in Figure 1 as associated with certain parts of an automobile whereof the clutch pedal is indicated at P, the gear shift lever L and certain body or frame parts F to which the parts A and B are fixed, it not being necessary for an understanding of the invention that any other parts of the automobile be shown. Moreover, in the present disclosure the parts are shown for operating what is known in the art as a standard gear shift wherein the low gear position of the lever L is to the left and rear of an H-slot, the second gear position being forward and right and the high gear position being rearward and right. The neutral position is at the cross-bar of the H-slot while the sides of this slot guide the lever L in forward and rearward movements.

The pressure providing unit includes a pair of plates 10 having peripheral flanges 11 at their sides and upper end, these plates facing each other with their flanges in contact so that, when assembled, the plates constitute a shallow box. Near what may be termed the front of this box or casing the plates 10 are provided with oppositely disposed slots 12 below which straight grooves 13 are formed in the inner faces of the plates 10. Curving rearwardly and downwardly from the grooves 13 are rear grooves 14 the lower portions of which are parallel to the grooves 13. Between the plates 10 is fitted a pusher bar 15 having a long cross head 16 at its upper end and a short cross head 17 at its lower end. The arms of the cross head 16 extend through the slots 12 and the arms of the cross head 17 travel in the grooves 13 and 14 as will be presently explained. A pair of bars 18 have their upper ends pivoted on the projecting ends of the cross head 16 and embrace the casing to extend down in front thereof. These arms have their lower ends connected by cross bars 19. The lowermost cross bar 19 is connected to the shank of the pedal P by any suitable means such as a bracket 20. The unit A is so positioned that the downward movement of the pedal P necessary to effect unclutching of the automobile clutch will effect downward movement of the pusher bar 15 while the upward movement of the pedal will effect corresponding upward movement of the pusher bar.

The lower edges of the plates 10 are provided with outwardly extending flanges 21 which are attached to the head 22 of a cylinder 23. The head 22 thus holds the lower ends of the casing sides together and is in turn supported by the casing. In the cylinder 23 is fitted a suitably packed piston 24 whereto is fixed a piston rod 25 which projects through the head 22 into the casing and lies between the grooves 13. At the upper end of this piston rod 25 there is provided a fork 26 wherein the lower cross head 17 is adapted to engage during certain times in the operation of the device. Pivoted to the rear arm of the fork 26 is a swinging arm 27 of such length that it lies across the upper end of the groove 14 when the piston 25 is in the upper end of the cylinder but is below this upper end of the groove 14 when the piston is central of its stroke. A rib 28 is provided on one or both plates to form a wall along the forward side of the straight part of the groove 14. A spring 29 has its upper end fixed to the lower part of the rear face of the arm 27 and has its lower end extending below the pivot of the arm 27 and bearing against the front face of the wall 28. By this means the arm 27 is normally held in vertical position but may swing forwardly on its pivot under certain conditions of operation. A suitable slot is provided in the upper rear edge of the casing and in this slot is positioned a cylinder 30 having a head 31 at its lower end. External flanges 32 are provided on the casing between which the cylinder 30 lies and suitable screws secure the cylinder to these flanges. A piston 33 is fitted in this cylinder and carries a piston rod 34 which has its lower end bent forwardly to lie between the straight portions of the grooves 14. To the lower end of the cylinder 23 is attached a pipe 35 and a similar pipe 36 is attached to the lower end of the cylinder 30. Vents 37 are provided to allow air to flow into and out of the spaces above the pistons in these cylinders. At the front of the casing there is provided an opening 38 and a housing 39 of cylindrical form is fitted over this opening. In this housing and extending through the opening 38 is a plunger 40 which has its rear end forked as at 41 to embrace the pusher rod 15 while allowing the rod free movement longitudinally. A spring 42 in the housing urges the plunger rearwardly and a pull wire 43 (for instance a Bowden wire) is attached to the plunger and passes through the end of the housing to any suitable location convenient to the operator, being there provided with a knob or handle 44. Brackets 45 serve to mount this part of the apparatus on a body or frame part F.

Considering now the pressure actuated means (see Figures 5 and 6) it will be seen that there is provided a cylinder 46 having a head 47. A bracket 48 is fixed in suitable position to a frame or body part F and to this bracket is pivoted by a vertical pivot 49 one end of an arm 50 which has its other end fixed to the end of the cylinder 46 opposite the head 47. The head end of the cylinder may thus swing to the right or left. A bracket 51 is fixed to the head end of the cylinder and has one end of a tension spring 52 attached thereto, the other end of this spring being attached to a suitable bracket (not shown) attached to a frame or body part. The head end of the cylinder 46 is thus constantly urged to the right.

In the cylinder 46 is a piston 54 to which is fixed a piston rod 55 which projects through the head 47 and has at its outer end a ring 56 surrounding the lever L, a washer 57 being mounted in the ring to grip the lever L.

For the standard form of gear shift, if the cylinder 46 is forward of the lever L, the pipe 35 is connected to the head end of the cylinder 46 and the pipe 36 is connected to the opposite end. These pipes are transposed if the cylinder 46 is to the rear of the lever L or if the gear shift is of the type in which the high gear position of the lever L is forward. In any case the apparatus is filled between the pistons 24 and 33 and the piston 54 with suitable liquid such as that used in the hydraulic brake apparatus of automobiles.

In the description of the operation now to follow it is assumed that the gear shift is standard and the operation starts with the gear shift lever in neutral so that all pistons are in their central positions.

Under these conditions the arm 27 is below the opening to the grooves 14 and the spring 42 is urging the lower end of the bar 15 toward the rear of the casing. The operator now manually moves the lever L to the left and steps on the pedal P. This moves the pusher bar downwardly. As the lower cross head moves down the grooves it is pushed by the spring 42 into the grooves 14 and, moving down these grooves, engages the bent portion of the piston rod 34 and carries it down thus causing the piston 33 to force liquid from the cylinder 30 through the pipe 36 and into the forward end of the cylinder 46 so that the piston 54 travels to the rear and correspondingly moves the lever L rearwardly to low position, the lever having been held to the left during this, first by the operator and then by the left side of the H-slot. The operator, of course, needs no longer to touch the lever L after it has started rearwardly. The movement of the piston 54 to the rear forces liquid from the rear end of the cylinder 46. This causes the arm 27 to rise into position across the entrance to the slots 14. The pedal is now allowed to rise thus clutching the driving mechanism of the car in low gear. As the pedal rises the bar 15 rises and the arm or gate 27 yields to permit the lower cross head to pass into the upper parts of the slots 13. The operator again depresses the pedal. This carries the bar 15 down with its lower cross head engaging the slots 13 and being prevented from entering the slots 14 by the arm or gate 27. The cross head 17 engages the fork 26 and pushes the piston 24 downwardly causing liquid to flow into the rear end of cylinder 46 and thus moving the piston 47 and lever L forwardly. As the lever passes the neutral point the spring 52 pulls the rear end of the cylinder to the right and carries the lever L with it so that continuation of its forward movement causes it to assume second gear position. Movement of the piston 54 in forward direction expels liquid from the front end of the cylinder through the pipe 36 and raises the piston 33 so that the bent end of its rod 37 lies near the top of the grooves 14. Also, the arm or gate 27 has been moved down to open the path to the grooves 14. The car is now in second gear and upon allowing the pedal to rise will move forwardly in second gear. When sufficient speed has been acquired the pedal is again depressed. The bar 15 moves down the casing but, since the gate 27 is down, the cross head 17 moves into the grooves 14 and engages the bent end of the piston rod 34 moving it and its piston downwardly to force liquid into the front end of the cylinder 46 to move the lever L to the rear into high gear position. The piston 24, of course, rises as the piston 33 is depressed so that, upon release of the pedal the cross head 17 rises, opens the gate and passes into the groove 13. Obviously, the lever L may be moved into neutral position from its other positions by simply depressing the pedal and then releasing it when the lever L is in neutral position.

Thus, after the engine is warmed it is not necessary in stopping in city traffic to use the low gear when again starting. The lever L may be moved from high to neutral and allowed to remain there while the car is at rest. Then, by depressing the pedal while the plunger 40 is held by pulling on the wire 43, the lower cross head 17 will be prevented from passing into the grooves 14 and will pass down the grooves 13 to further move the fork downwardly as before thus causing the lever L to move to second gear position. From this position it can be caused to move to the high gear position as before described.

There has thus been provided a simple and efficient device of the kind described and for the purpose specified.

It is obvious that changes may be made in the form and construction of the invention without departing from the material principles thereof. It is not, therefore, desired to confine the invention to the exact form herein shown and described but it is desired to include all such as come within the scope of the appended claims.

What is claimed is:

1. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, and means adapted to be actuated by depression of the clutch pedal for alternately moving the piston rods in pressure producing direction.

2. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, and means adapted to be actuated by depression of the clutch pedal for alternately moving the piston rods in pressure producing direction, said means including a presser bar adapted for link connection at one end to the pedal to reciprocate therewith, and means to guide the presser bar into alternate engagement with said piston rods to actuate said rods.

3. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, and means to effect guidance of the last mentioned end of the presser bar alternately into the branches of the first mentioned guide means.

4. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, and a gate carried by the piston rod of one of the pair of pressure cylinders and movable with the rod to close the entrance of the last mentioned branch in one position and to open said entrance in other position.

5. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, and a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position.

6. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position, and a spring carried by the gate and normally holding it against swinging movement.

7. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, and means to restrain the last mentioned spring means from effective action on said presser bar.

8. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position, a spring carried by the gate and normally holding it against swinging movement, and means to restrain the spring means for the presser bar from effective action on said bar.

9. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, means adapted to be actuated by depression of the clutch pedal for alternately moving the piston rods in pressure producing direction, a pivotal mounting for the first cylinder arranged to permit movement of the piston rod laterally, and a spring urging said first cylinder to move on its pivot in a direction to shift the gear lever to position between its positions of second and high gear.

10. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, means adapted to be actuated by depression of the clutch pedal for alternately moving the piston rods in pressure producing direction, said means including a presser bar adapted for link connection at one end to the pedal to reciprocate therewith, means to guide the presser bar into alternate engagement with said piston rods to actuate said rods, a pivotal mounting for the first cylinder arranged to permit movement of the piston rod laterally, and a spring urging said first cylinder to move on its pivot in a direction to shift the gear lever to position between its positions of second and high gear.

11. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, means to effect guidance of the last mentioned end of the presser bar alternately into the branches of the first mentioned guide means, a pivotal mounting for the first cylinder arranged to permit movement of the piston rod laterally, and a spring urging said first cylinder to move on its pivot in a direction to shift the gear lever to position between its positions of second and high gear.

12. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, a pivotal mounting for the first cylinder arranged to permit movement of the piston rod laterally, and a spring urging said first cylinder to move on its pivot in a direction to shift the gear lever to position between its positions of second and high gear.

13. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position, a pivotal mounting for the first cylinder arranged to permit movement of the piston rod laterally, and a spring urging said first cylinder to move on its pivot in a direction to shift the gear lever to position between its positions of second and high gear.

14. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position, a spring carried by the gate and normally holding it against swinging movement, a pivotal mounting for the first cylinder arranged to permit movement of the piston rod laterally, and a spring urging said first cylinder to move on its pivot in a direction to shift the gear lever to position between its positions of second and high gear.

15. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, means to restrain the last mentioned spring means from effective action on said presser bar, a pivotal mounting for the first cylinder arranged to permit movement of the piston rod laterally, and a spring urging said first cylinder to move on its pivot in a direction to shift the gear lever to position between its positions of second and high gear.

16. In a pneumatic gear shifting attachment for automobiles having a gear shift lever and a clutch pedal, a cylinder, a piston reciprocable in said cylinder provided with a piston rod for connection to the gear shift lever to move the lever backward and forward as the piston reciprocates, a pair of pressure cylinders each pipe connected to a respective end of the first cylinder, each of said pressure cylinders being provided with a piston and piston rod, a casing associated with the pressure cylinders, a presser bar in said casing and having one end guided for rectilineal movement in the casing, link means for connecting the said end of the presser bar to the pedal, branched guide means in said casing for guiding the remaining end of the presser bar and having the ends of the piston rods of the pressure cylinders extending across the respective branches, spring means urging the last mentioned end of the presser bar into one of said branches of said guide means, a gate carried by the piston rod of one of the pair of pressure cylinders and movable with the rod to close the entrance of the last mentioned branch in one position and to open said entrance in other positions, said gate being pivoted to its piston rod to swing for the free passage of an object from said branch upon the gate being in branch closing position, a spring carried by the gate and normally holding it against swinging movement, means to restrain the spring means for the presser bar from effective action on said bar, a pivotal mounting for the first cylinder arranged to permit movement of the piston rod laterally, and a spring urging said first cylinder to move on its pivot in a direction to shift the gear lever to position between its positions of second and high gear.

LOUIS D. FOLEY.